United States Patent [19]

Hörmansdörfer

[11] Patent Number: 4,972,901

[45] Date of Patent: Nov. 27, 1990

[54] LATENT HEAT STORAGE MEANS ADAPTED TO STORE HEAT FROM THE RADIATOR OF A MOTOR VEHICLE

[76] Inventor: Gerd Hörmansdörfer, Kastanieneck 6 A, D-3167 Burgdorf-Beinhorn, Fed. Rep. of Germany

[21] Appl. No.: 365,755

[22] Filed: Jun. 13, 1989

[30] Foreign Application Priority Data

Jun. 15, 1988 [DE] Fed. Rep. of Germany ....... 3820375

[51] Int. Cl.$^5$ .................... B60H 1/08; F28D 20/00; F02M 31/00
[52] U.S. Cl. ........................................ 165/41; 165/10; 165/104.11; 123/41.14; 252/70
[58] Field of Search .................. 165/10, 41, 104.11; 123/41.14, 104.5; 252/70

[56] References Cited

U.S. PATENT DOCUMENTS 1,634,394 7/1927 Bernard ............................. 123/41.14
4,414,932 11/1983 Lindberg .......................... 123/41.14

FOREIGN PATENT DOCUMENTS 2749030 5/1978 Fed. Rep. of Germany ........ 165/10

*Primary Examiner*—Albert W. Davis, Jr.
*Attorney, Agent, or Firm*—Harness, Dickey & Pierce

[57] ABSTRACT

A latent heat storage means arranged to be thermally charged by radiator water in a motor vehicle uses 1,12-diaminododecane as the storage medium.

1 Claim, No Drawings

LATENT HEAT STORAGE MEANS ADAPTED TO STORE HEAT FROM THE RADIATOR OF A MOTOR VEHICLE

BACKGROUND OF THE INVENTION

The invention relates to a latent heat storage means adapted to store heat from the radiator of a motor vehicle in which it is mounted so that the radiator water may flow along a flow path and an with enclosure, separated from the latter by a heat exchanger surface, for the heat exchange medium.

A proposal has already been made to store the waste heat of IC engines in motor vehicles in heat storage means so that thermal energy is available for defrosting, for heating the driver's cab or car interior and/or heating up the engine and thus increasing the comfort of the driver and the working life of the engine. Furthermore, the fuel consumption and the emission of pollutants may both be reduced.

In the case of application to private cars it is more particularly necessary for the space requirement and the weight to be taken into account. Owing to the high storage capacity for a relatively low overall size the use of latent heat storage means is looked upon as being highly suitable for private cars.

As regards the selection of the heat storage medium care must be taken to see that the phase transition temperature comes within the desired range and it may be subjected without decomposition to the maximum temperature of the heat vehicle, in this case the radiator water. Furthermore it has to have a sufficient energy storage density in terms of the volume and mass. Materials which have an aggressive effect on the materials used for the construction of the storage means are unsuitable for heat storage.

So far materials suggested for use in automobiles and capable of yielding satisfactory results have been inorganic materials such as sodium hydroxide, in which case it is then necessary to use a material resistant, such as stainless steel, to the medium for containing it. Aluminum, which would otherwise be advantageous for the housing, may not be utilized, since it is attacked by the storage medium.

If water is used for charging the heat storage means, it is not possible to fully exclude the possibility of storage medium making its way into the radiator cooling circuit owing to leaks. Even indirect charging of the heat storage means via a secondary circuit heated by a heat exchanger is not able to fully eliminate this danger, apart from the fact the space requirement, the weight and the costs of the secondary circuit are a disadvantage.

In view of the ever increasing use of light metal alloys for the construction of modern engines it is necessary to exclude any possibility of corrosive materials, more particularly those which would attack aluminum, silicon and alloys thereof, finding their way into the cooling water cooling circuit.

SUMMARY OF THE INVENTION

One object of the present invention is to select a storage medium for a latent heat storage means of the initially mentioned type which has a sufficient energy density, a suitable phase transition temperature, a relatively low vapor pressure and a reasonable price.

A further aim of the invention is to select such a material which is noncorrosive with respect to the materials used in engine construction and exposed to the action of the cooling water, more especially aluminum and its alloys.

In accordance with a further aim of the invention the storage medium should be physiologically unobjectionable and its disposal should have a deleterious effect on the environment.

In order to achieve these or other aims the invention provides 1,2-diaminododecane as the storage medium.

The basic suitability of aliphatic diamines of the structural formula $H_2N-(CH_2)n-NH_2$ in which n is a whole number between 4 and 14 as a storage medium for latent heat storage means is noted in the European patent 0 094 366. It has now turned out that 1,12-diaminododecane ($H_2N-(CH_2)_{12}-NH_2$) is well suited to attaining the aim in question. It has an acceptable energy density related to the volume, a very good energy density related to mass, the phase transition temperature in the required range, it is free of corrosive effects on structural materials, more especially aluminum, silicon and alloys thereof and in fact it provides a corrosion inhibiting effect. The price is acceptable for the intended purpose. The use of 1,12-diaminododecane as a storage medium makes it possible for the radiator water to be directly used for charging the heat storage means and there are no objections to the use of low-weight aluminum or alloys thereof or of silicon alloys in the areas coming into contact with the storage medium.

A still further advantage is to be seen in the relatively unobjectionable nature of the storage medium from the physiological aspect so that its handling during production of the heat storage means is simplified and risks likely when accidents occur are reduced.

The heat storage medium is only sparingly soluble in water and solubility amounts to only 0.1%. It may be mechanically separated from water and if used competently does not, judging form experience so far, present any danger of pollution of the sewerage system.

I claim:

1. A latent heat storage means for a motor vehicle comprising means for defining a flow path for engine radiator water and a heat exchange surface surrounding 1,12-diaminododecane as a latent heat storage means.

* * * * *